(12) United States Patent
Tobagi et al.

(10) Patent No.: US 7,142,508 B2
(45) Date of Patent: Nov. 28, 2006

(54) SYSTEM AND METHOD FOR CONTROLLING DATA TRANSFER RATES ON A NETWORK

(75) Inventors: Fouad A. Tobagi, Los Altos, CA (US); David Lemke, Mountain View, CA (US); Srikanth Subramanian, San Jose, CA (US)

(73) Assignee: Radiance Technologies, Inc., Los Altos, CA (US)

( * ) Notice: Subject to any disclaimer, the term of this patent is extended or adjusted under 35 U.S.C. 154(b) by 642 days.

(21) Appl. No.: 09/853,816

(22) Filed: May 11, 2001

(65) Prior Publication Data

US 2002/0080721 A1  Jun. 27, 2002

Related U.S. Application Data

(60) Provisional application No. 60/257,651, filed on Dec. 22, 2000, provisional application No. 60/257,654, filed on Dec. 22, 2000.

(51) Int. Cl.
*H04L 12/26* (2006.01)
*H04J 1/16* (2006.01)
*G08C 15/00* (2006.01)
*G06F 11/00* (2006.01)
*G01R 31/08* (2006.01)

(52) U.S. Cl. .................. 370/230; 370/236; 370/412

(58) Field of Classification Search ............... 370/223, 370/229–236, 241–252, 338, 349, 391–395, 370/400–468; 709/219, 224, 232–244, 226–228; 710/29, 52, 57, 56, 5, 6, 21
See application file for complete search history.

(56) References Cited

U.S. PATENT DOCUMENTS

| | | | |
|---|---|---|---|
| 4,642,758 A | 2/1987 | Teng | |
| 4,644,463 A | 2/1987 | Hotchkin et al. | |
| 5,523,854 A | 6/1996 | Hornsby | |
| 5,557,320 A | 9/1996 | Krebs | |
| 5,708,960 A | 1/1998 | Kamisaka et al. | |
| 5,802,292 A | 9/1998 | Mogul | |
| 5,886,793 A | 3/1999 | Satou | |
| 5,920,700 A | 7/1999 | Gordon et al. | |
| 5,920,701 A | 7/1999 | Miller et al. | |
| 5,933,413 A * | 8/1999 | Merchant et al. ........... 370/234 |

(Continued)

OTHER PUBLICATIONS

U.S. Appl. No. 09/852,464, Ray Milkey, System for Automated and Optimized File Transfers Among Computers over a Network, filed May 9, 2001.

(Continued)

*Primary Examiner*—Man U. Phan
(74) *Attorney, Agent, or Firm*—Carr & Ferrell LLP

(57) ABSTRACT

Data transfer rates on a network are controlled in conjunction with TCP/IP protocols by limiting the available space in a receive buffer located on the receiver. Limits are generated by either moderating the rate that data is removed from the receive buffer or changing the receive buffer's size. Transfer rates are reduced to decrease the impact large transfers have on other network traffic and to reduce the total number of lost data packets. Reduced rates and priorities can be managed by scheduling systems.

31 Claims, 7 Drawing Sheets

U.S. PATENT DOCUMENTS

| | | | |
|---|---|---|---|
| 5,933,603 | A | 8/1999 | Vahalia et al. |
| 5,978,363 | A | 11/1999 | Dimitrijevic et al. |
| 6,003,082 | A | 12/1999 | Gampper et al. |
| 6,026,097 | A | 2/2000 | Voois et al. |
| 6,038,216 | A * | 3/2000 | Packer ............... 370/231 |
| 6,052,710 | A | 4/2000 | Saliba et al. |
| 6,052,734 | A * | 4/2000 | Ito et al. ............... 709/235 |
| 6,070,191 | A | 5/2000 | Narendran et al. |
| 6,085,193 | A | 7/2000 | Malkin et al. |
| 6,098,064 | A | 8/2000 | Pirolli et al. |
| 6,098,096 | A | 8/2000 | Tsirigotis et al. |
| 6,134,584 | A | 10/2000 | Chang et al. |
| 6,134,596 | A | 10/2000 | Bolosky et al. |
| 6,141,754 | A | 10/2000 | Choy |
| 6,208,661 | B1 | 3/2001 | Marshall |
| 6,240,460 | B1 * | 5/2001 | Mitsutake et al. ..... 709/235 |
| 6,324,570 | B1 | 11/2001 | Tonchev et al. |
| 6,332,023 | B1 * | 12/2001 | Porter et al. ........... 379/242 |
| 6,337,850 | B1 * | 1/2002 | Nakano et al. ......... 370/230 |
| 6,374,336 | B1 | 4/2002 | Peters et al. |
| 6,397,251 | B1 * | 5/2002 | Graf ..................... 709/225 |
| 6,427,140 | B1 | 7/2002 | Ginter et al. |
| 6,560,651 | B1 | 5/2003 | Katz et al. |
| 6,657,954 | B1 * | 12/2003 | Bird et al. ............. 370/229 |
| 6,715,007 | B1 * | 3/2004 | Williams et al. .......... 710/52 |
| 6,741,563 | B1 * | 5/2004 | Packer ............... 370/231 |
| 6,748,447 | B1 | 6/2004 | Basani et al. |
| 6,754,200 | B1 * | 6/2004 | Nishimura et al. ...... 370/349 |
| 6,771,603 | B1 * | 8/2004 | Yi et al. ............... 370/236 |
| 6,775,665 | B1 | 8/2004 | Piersol |
| 6,789,108 | B1 | 9/2004 | McMillan |
| 6,798,787 | B1 * | 9/2004 | Kikuchi et al. ......... 370/468 |
| 6,813,244 | B1 * | 11/2004 | He et al. ............... 370/235 |
| 6,816,798 | B1 | 11/2004 | Pena-Nieves et al. |
| 6,959,327 | B1 | 10/2005 | Vogl et al. |
| 6,959,451 | B1 | 10/2005 | Ramanathan |
| 6,975,648 | B1 * | 12/2005 | Kikuchi et al. ......... 370/468 |
| 2002/0002618 | A1 * | 1/2002 | Vange ................. 709/228 |
| 2002/0083185 | A1 | 6/2002 | Ruttenberg et al. |
| 2004/0022191 | A1 | 2/2004 | Bernet et al. |
| 2004/0071085 | A1 * | 4/2004 | Shaham et al. ......... 370/230 |
| 2004/0114607 | A1 * | 6/2004 | Shay et al. ........... 370/395.42 |

OTHER PUBLICATIONS

Merriam-Webster Online Dictionary (schedule); www.m-w.com (accessed May 5, 2005).

Merriam-Webster Online Dictionary (priority); www.m-w.com (accessed May 5, 2005).

Federal Standard 1037C: Glossary of Telecommunications Terms: Network Interface Device (access Sep. 16, 2005).

Newton's Telecom Dictionary (2004 20th Ed.): Network Controller.

Newton's Telecom Dictionary (2004 20th Ed.): Network Interface Card.

* cited by examiner

SYSTEM AND METHOD FOR CONTROLLING DATA TRANSFER RATES ON A NETWORK

CROSS-REFERENCE TO RELATED APPLICATIONS

This application claims the priority benefit of U.S. Provisional Patent Application No. 60/257,651, entitled "System and Method For Rate Controlled Data Transfer Over A Network," filed Dec. 22, 2000; and U.S. Provisional Patent Application No. 60/257,654, entitled "System and Method for Scheduling Data Transfers Through a Network," filed Dec. 22, 2000, the disclosures of which are hereby incorporated by reference. This application is related to co-pending U.S. patent application Ser. No. 09/935,016, entitled "System and Method for Scheduling Data Transfers Through a Network," filed Aug. 21, 2001 and co-pending U.S. patent application Ser. No. 09/852,464 entitled "System and Method for Automated and Optimized File Transfers Among Devices in a Network," filed May 9, 2001.

BACKGROUND

1. Field of the Invention

The invention relates to network communications and more specifically to the management of data transfer rates under TCP/IP protocols.

2. Background of the Invention

As illustrated in prior art FIG. 1, a computer network, generally designated 100, includes a plurality of receivers 110, each connected through communications channels 115 to a network 120. Network 120 is also connected through communications channels 115 to a sender 130 and an intermediary 140. Intermediary 140 serves as a transmission node or cache system between various parts of network 120, sender 130, or receivers 110. In some cases, receiver 110 and sender 130 are a network client and network server respectively.

Communications between the elements of computer network 100 are typically managed using a layered series of software and hardware systems. Prior art FIG. 2 illustrates some of the various layers involved when computer network 100 includes the World Wide Web. A top layer includes FTP/HTTP 210 (File Transfer Protocol and Hypertext Transfer Protocol). These standard components serve as the interface between lower levels of the communication system and application programs such as browsers. FTP/HTTP 210 operates above a TCP (Transmission Control Protocol) 220 layer that facilitates the delivery and reception of data packets to and from devices in computer network 100. IP (Internet Protocol) 230 layer, data link 240 layer, and physical network 250 perform well known standard operations enabling the transfer of data.

TCP 220 includes software running on both sender and receiver 110 devices. TCP 220 hides the details pertaining to the network and its characteristics from FTP/HTTP 210 and communicates with FTP/HTTP 210 through a simple TCP application programming interface (API). TCP 220 has three roles: (a) it prevents congestion at the receiver, (b) it prevents congestion in the network along the path used from source to destination, and (c) it guarantees a reliable data transfer.

At sender 130, buffers in TCP 220 receive data to be transferred from applications at FTP/HTTP 210. These buffers are referred to as the "TCP Send Buffers." Likewise, at receiver 110, there are "TCP Receive Buffers" associated with each sender 130, from which applications on receiver 110 read data transferred over network 120. A pair of send and receive buffers exists for each TCP connection. Data are written to and read from the send and receive buffers in blocks of various sizes.

FIG. 3 illustrates a prior art receive buffer 310 associated with TCP 220 on a receiver 110. Receive buffer 310 contains data 320 and has a limited available space of a size, known as the receive window Wr 330, where additional data could be stored. TCP 220 uses an explicit feedback mechanism to prevent congestion at receiver 110 and overflow of receive buffer 310. Receiver 110 declares the size (number of bytes) of receive window Wr 330 in each acknowledgement sent back to sender 130. Sender 130 never allows the amount of outstanding data transmitted and not yet acknowledged to exceed Wr 330.

To prevent congestion along a communications path, TCP 220 follows a congestion control algorithm that limits the amount of outstanding data. The congestion control algorithm contends with the fact that no information is available regarding the available bandwidth of the path from sender 130 to receiver 110. The congestion control algorithm starts by allowing a small amount of outstanding data and then increases the amount of outstanding data allowed as acknowledgements are received from receiver 110. The amount of outstanding data allowed by the congestion control algorithm is referred to as the congestion window (Wc). The actual amount of data that can be sent is the send window (Ws), which is equal to the minimum of Wr 330 and Wc.

To illustrate the dynamics of the congestion window $W_c$, one may momentarily assume that there is an abundance of data to send and that receive window Wr 330 is very large, and therefore does not place any limitation on the size of the send window Ws. The congestion control algorithm starts with a small congestion window (Wc) equal to the maximum size of a single TCP segment. The first transmission includes only one TCP segment, carrying at most an amount of data equal to the maximum segment size (MSS). When an acknowledgement of the first segment is returned from receiver 110, the congestion window Wc is increased by another MSS to two times MSS. Since, for this illustration, Wr 330 is assumed to be very large, the send window Ws also becomes two times MSS. The maximum amount of data that can be sent in the next transmission (Ws) is now two times MSS. When two segments are sent, each is acknowledged independently by receiver 110 and as each acknowledgement is received the congestion window Wc is increased by MSS. After both acknowledgements are received from a two-segment transmission, Wc (and Ws) will equal four times MSS. By increasing the size of the congestion window by one MSS for each acknowledgement received, the number of segments in each transmission doubles as each previous transmission is fully acknowledged. This increase continues until the congestion window Wc reaches a certain value called the "threshold." Beyond the threshold, the congestion window Wc is incremented by only one MSS for each set of transmissions. This phase of the congestion control algorithm is referred to as the congestion avoidance phase. The congestion window Wc keeps increasing, albeit at a smaller (linear) rate instead of an exponential rate, until the size of the congestion window Wc reaches a preset maximum. This maximum is a predetermined system parameter. Since the congestion window Wc increases over time, the likelihood of congestion and, therefore, loss of a packet on the network also increases over time. If a TCP segment is lost in the network, the lack of acknowledgement from receiver 110 within a timeout period triggers the retransmission of the lost segment and all segments following it and also resets the size of congestion window Wc (and Ws) to MSS. The process described above is then repeated. TCP 220, therefore, does not maintain a constant transmission rate, but rather transmits data using a congestion window that increases according to first an exponential rule and then a linear rule until a transmission loss occurs and Wc is reset.

FIG. 4 is a prior art illustration of congestion window Wc size as a function of time. During an initial phase 410 the congestion window Wc increases exponentially, from an initial size of one MSS, until it reaches a threshold (Thr 430). Wc then increases linearly during a second phase 440, until at time 450 a segment (data packet) is lost at which time Wc is reset to one MSS and the process is repeated. Time 450 can occur at any point in each cycle. Wc will stop increasing if a maximum size (max 480) is reached before a data segment is lost. The loss of data segments is dependent on the bandwidth of network 120 and the constantly variable traffic it supports. The value of max 480 is a system parameter associated with elements on network 120. After a packet is lost, a new threshold (ThrB 420) is set as a function of the largest window size reached on the previous cycle. The cycles are repeated until all data transmission is completed or a timeout occurs.

When Wr 330 is finite the send window, Ws, is determined by Wr 330 if Wr 330 is less than Wc. Ws is always the minimum of the current value of Wc and the most recently declared value of Wr 330.

A method of controlling the rate of data transfer is to limit the rate at which the application at sender 130 writes data to the send buffer. This is accomplished by limiting the size and frequency of data blocks written to the send buffer. Writing blocks of small size and high frequency can represent a high overhead at sender 130. Since sender 130 is typically a server serving a large number of clients, the preference of sender 130 is to use large blocks, and to control the rate by controlling the frequency of writes. However, writing large size blocks gives TCP 220 an opportunity to send large batches. Large batches generate traffic of a bursting nature and thus are more likely than traffic of a steady nature to cause congestion in network 120.

The prior art systems described above have a number of disadvantages. The variable send window Ws implies that an optimal transmission rate is never maintained. The average transmission rate also varies as a function of total traffic on the network. This variability makes scheduling of large data transfers difficult and allows large transfers to have a significant impact on other data. To be practical any solutions to these problems must be made utilizing the current standardized protocols.

Two prior art methods of regulating transfer rates involve intercepting the acknowledgement sent from receiver 110 to sender 130. In the first method the acknowledgement is delayed for a period of time and in the second the value of Wr reported within the acknowledgement is modified by inserting a new value. Both of these approaches have significant disadvantages, including the necessity of intercepting packets in the network.

Further information about TCP/IP and the state of the art in data transfer methods is found in the following references:

W. Richard Stevens, "TCP/IP Illustrated. Vol I—The Protocols," Addison-Wesley, 1994;

Comer, Douglas, "Internetworking with TCP/IP. Vol. I.," Prentice Hall, 1991;

Comer, Douglas, and Stevens, David, "Internetworking with TCP/IP. Vol. II.," Design, Implementation, and Internals. Prentice Hall, 1991; and Packer, Robert L., "Method for Explicit Data Rate Control in a Packet Communication Environment Without Data Rate Supervision", U.S. Pat. No. 6,038,216.

SUMMARY OF THE INVENTION

The invention includes methods of regulating the rate of transmission on a computer network employing TCP. The methods involve moderating the amount of available space in a receive buffer by either reducing the rate at which data is removed from the receive buffer or changing the size of the receive buffer. By moderating the available space in the receive buffer, the size of data blocks sent by a sender is controlled and the average transmission rate is regulated.

Embodiments of the system for regulating an average rate of transmission on a computer network include a rate control software module, running on the receiver, that monitors the actual transmission rate, the number of lost packets, and the size of the receiver's receive window (Wr). In an embodiment of the invention the rate control module regulates the rate at which data is removed from the receive buffer. In another embodiment the rate control module adjusts the size of the receive buffer. In both of these embodiments, the rate control module moderates the size of the receiver's receive window, which controls the rate at which the sender transmits data.

The rate control module optionally operates in response to a priority or schedule associated with a data transmission. For example, the receiver attempts to achieve a transmission rate that is determined by a priority assigned to the data. Computer code operating on either the sender or the receiver optionally manages a schedule for a plurality of transmissions.

The invention allows the transfer of large data files in the "background" with controlled effects on other network traffic.

DETAILED DESCRIPTION OF THE DRAWINGS

Figure 5:
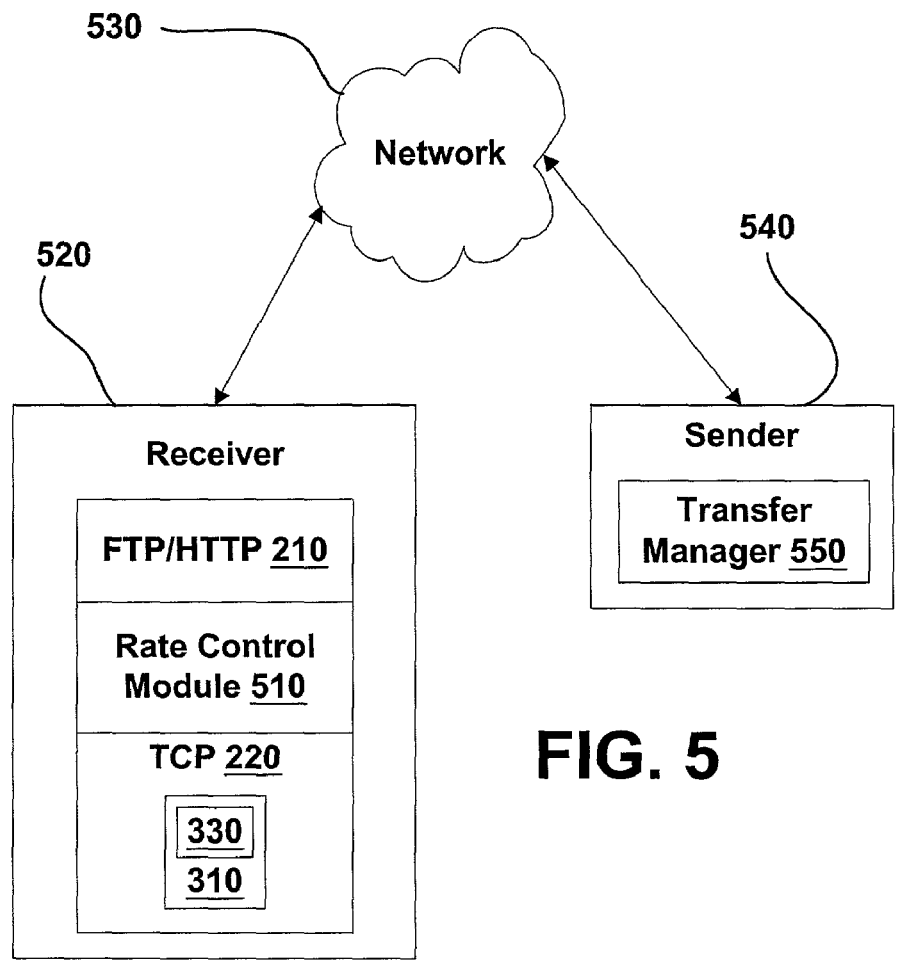
FIG. 5 is a block diagram of one embodiment of a computer network including a rate control module located on a receiver, according to the invention.

FIG. 5 is a block diagram of one embodiment of a computer network including a rate control module 510 located on a receiver 520, according to the invention. In the FIG. 5 embodiment, rate control module 510 is located above TCP 220 and below FTP/HTTP 210. In other embodiments, rate control module 510 is integrated into FTP/HTTP 210. Receiver 520 is coupled to a network 530 further coupled to at least one sender 540. Although not shown, sender 540 includes FTP/HTTP 210 and TCP 220. A transfer manager 550, used to further manage data transfers, is optionally located on sender 540. Receiver 520 and sender 540 are computing devices such as web servers, file servers, clients, personal computers, Internet appliances, set-top boxes, and the like.

Rate control module 510 controls data transmission rates by manipulating the reported size, Wr 330, of the receive window. The send window and thereby the transmission rate is limited by changing the size of the receive window as reported to sender 540 by TCP 220. Limiting the transmission rate of low priority data reduces the impact that low priority transmissions have on higher priority transmissions.

In one embodiment of the invention, rate control module 510 manipulates the size of receive window $W_R$ 330 by controlling the rate at which data are read from receive buffer 310. Manipulating this rate does not require modification of standard protocols and is, therefore; non-intrusive. When data is removed from receive buffer 310 in increments of a relatively small size, the declared available space Wr 330 sent back with each acknowledgement remains small, and thus limits send window Ws and the rate of data transmitted by sender 540.

Locating rate control module 510 on receiver 520 provides a number of advantages. Software on receiver 520 is capable of measuring an actual transfer rate more accurately than software located elsewhere. Rate control module 510 interrogates the TCP API and obtains the number of total bytes and free bytes in receive buffer 310. Rate control module 510 is thus able to monitor the absolute rates at which data are delivered to and read out of receive buffer 310. Rate control module 510 actively adapts the rate at which data are read from receive buffer 310, so as to control Wr 330 and thereby the rate at which sender 540 transmits data. Rate control module 510 can adapt the rate at a variety of times, e.g., just before a read operation. Through the two steps of (1) reading data from receive buffer 310 in increments of a certain size and frequency, and (2) examining the amount of data in receive buffer 310, many further methods of dynamic rate control, through the parameter Wr, are possible. This embodiment of rate control module 510 does not require modification of standard protocols such as TCP 220 or IP 230.

In an alternative embodiment, rate control module 510 manipulates the size of receive window $W_r$ 330 by modifying the size of receive buffer 310. Since TCP 220 uses the size of receive buffer 310 to calculate Wr 330, changing the size of receive buffer 310 influences the size of the send window Ws. The size of receive buffer 310 is changed using standard techniques. Modifying the size of receive buffer 310 has an advantage in that the rate that data is read from receive buffer 310 by FTP/HTTP 210 is not reduced. Controlling the transmission rate by modifying the size of receive buffer 310 is also used to prevent an initial burst of traffic during an initial phase of a transmission, when the congestion window $W_c$ is increasing exponentially.

Figure 6:
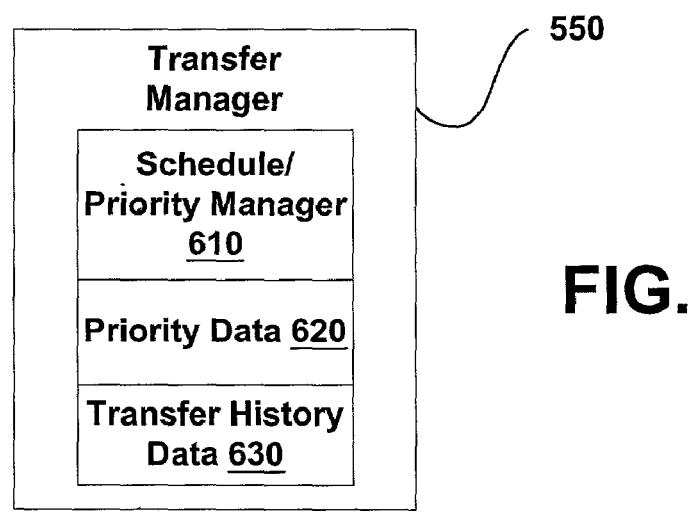
FIG. 6 is a block diagram of one embodiment of the transfer manager of FIG. 5, according to the invention.

FIG. 6 is a block diagram of one embodiment of the transfer manager 550 of FIG. 5, according to the invention. Transfer manager 550 includes, but is not limited to, a schedule/priority manager 610, optional priority data 620, and optional transfer history data 630. In other embodiments, transfer manager 550 is located on receiver 520, an intermediary between receiver 520 and sender 540, or an alternative computing device with access to receiver 520.

Schedule/priority manager 610 manages scheduling of data transfers and allows users to designate a level of priority for a data transfer. For example, data is scheduled to be transferred to receiver 520 before a specific deadline, or alternatively, the transfer is given a priority such that it does not interfere with other traffic on network 530. In one embodiment of transfer manager 550, a user selects a priority level for the data transfer. The selected priority level results in an absolute transfer rate or is responsive to other factors such as the total amount of traffic receiver 520 is receiving or the number of dropped packets experienced in the transfer. The rate of data transfer to receiver 520, for data transferred using the methods of the invention, is varied as a function of the amount of other traffic on network 530 or traffic receiver 520 is receiving. For example, receiver 520 begins a real-time video conference and as a result the transfer rate of a continuing low priority data transfer is reduced to regulate the effect that the low priority transfer has on the video conference. When the video conference is complete the transfer rate of the low priority data transfer is again adjusted.

Priority data 620 includes data provided by a user or supervisor that allows schedule/priority manager 610 to determine the relative priority of data transfers. Priority data 620 is used for determining transfer rates and transfer schedules. Transfer history data 630 is used to monitor the performance of transfer manager 550 and to estimate total transfer times.

In one embodiment, transfer manager 550 and receiver 520 first exchange information such as target transfer rates, transmission priority, historic transmission rates, reception rates, Wc, Ws, buffer information, or the like. Rate control module 510 at receiver 520 then uses this information to control the transmission such that it meets priority and schedule requirements while also having a regulated impact on network 530. Other shared data and factors, such as time of day, network load, and the like, are also optionally considered.

In another embodiment, transfer manager 550 regulates communications to a plurality of receiver 520. In this embodiment, transfer manager 550 is located on a router acting as an intermediary between the Internet and a local area network that includes a plurality of receiver 520. Transfer manager 550 assigns different priorities to data transfers as a function of the identity of receiver 520 or optionally assures that a data transfer to one receiver 520 does not significantly affect data transfers to a second receiver 520.

Figure 7:
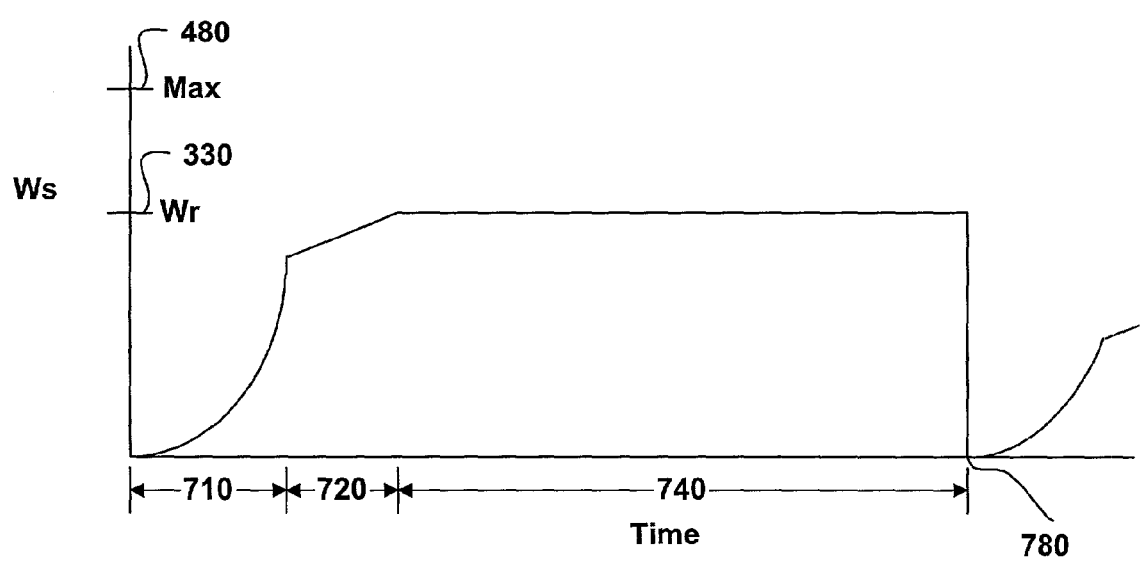
FIG. 7 is an illustration of send window size, Ws, as a function of time, according to one embodiment of the invention.

FIG. 7 is an illustration of send window size, Ws, as a function of time, according to one embodiment of the invention. After an initial period 710 of exponential growth, there is a period 720 of linear growth. This is followed by a period 740 during which rate control module 510 uses Wr 330 to control the send window (Ws) and thus the maximum transfer rate. The congestion window (Wc) can increase until it reaches max 480 (the default maximum). However, during the period 720 (or possibly initial period 710) Wr becomes the limiting factor since TCP 220 at sender 540 chooses the minimum of Wr and Wc for the value of Ws. Finally, at point 780, a data segment is lost, TCP 220 at sender 540 resets Wc, thus decreasing Ws to equal Wc, and the process is repeated. These events are detected by rate control module 510 at receiver 520 by observing the rate at which receive buffer 310 is being filled. If desired, the rate at which data are read from receive buffer 310 is changed (adjusting Wr) to compensate for changes in Ws.

Figure 1:
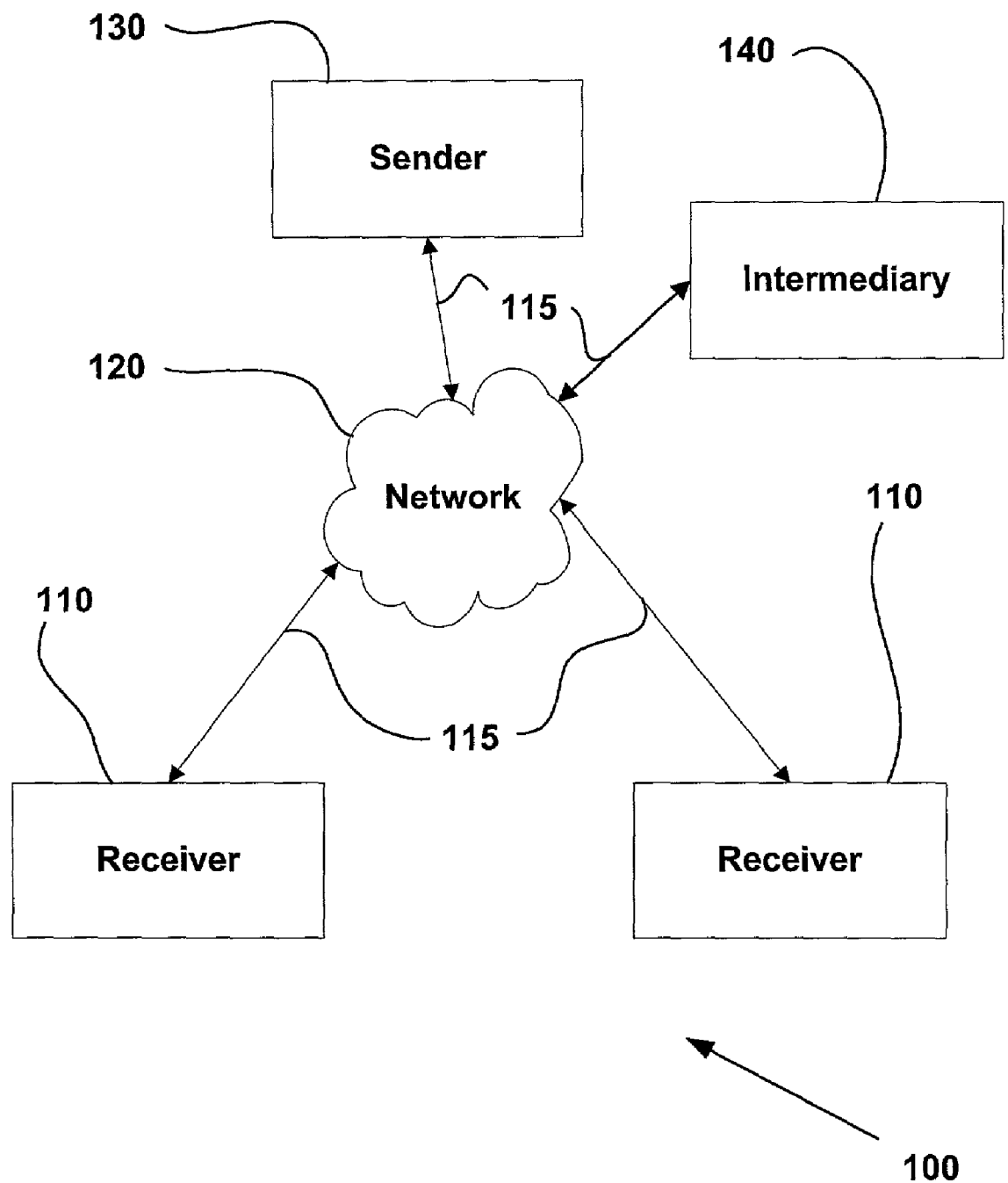
FIG. 1 is a prior art illustration of a computer network with a sender and receivers connected by a network.
Figure 2:
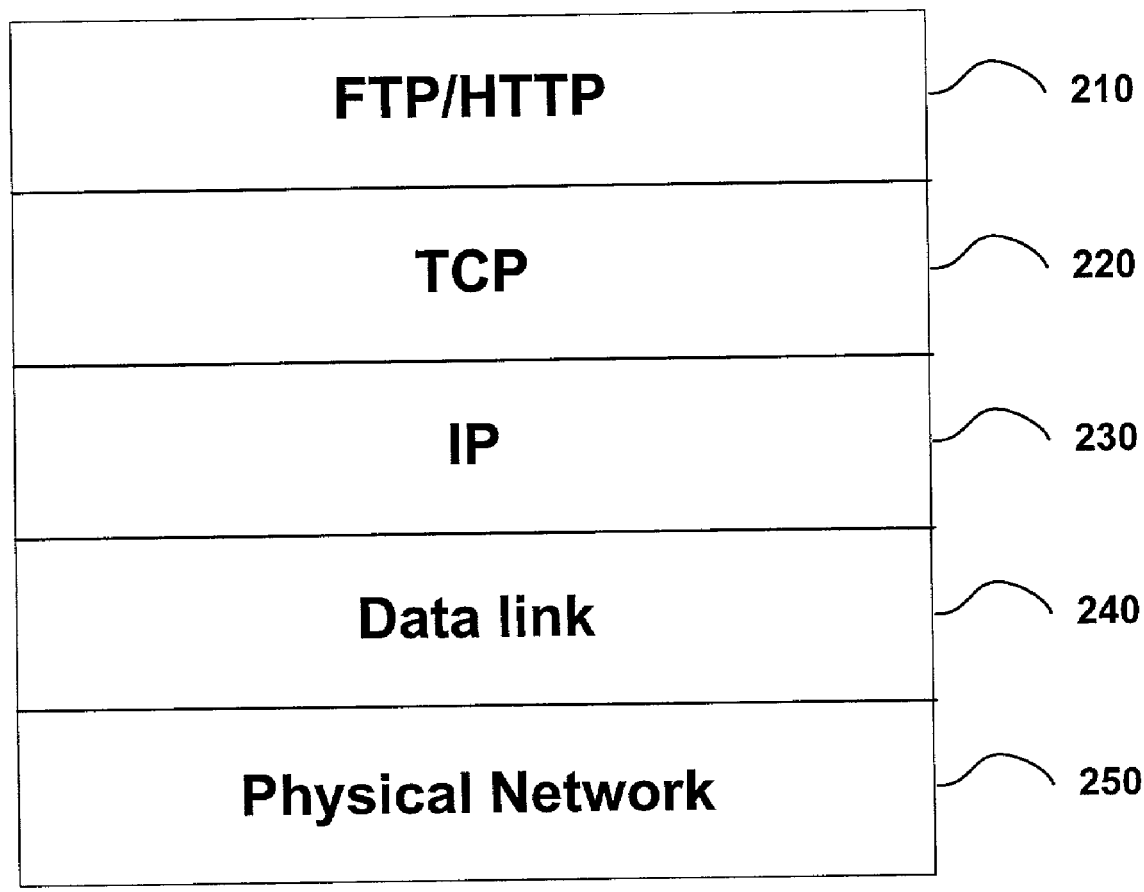
FIG. 2 is a prior art illustration of various layers of protocols involved in data communication over networks.
Figure 3:
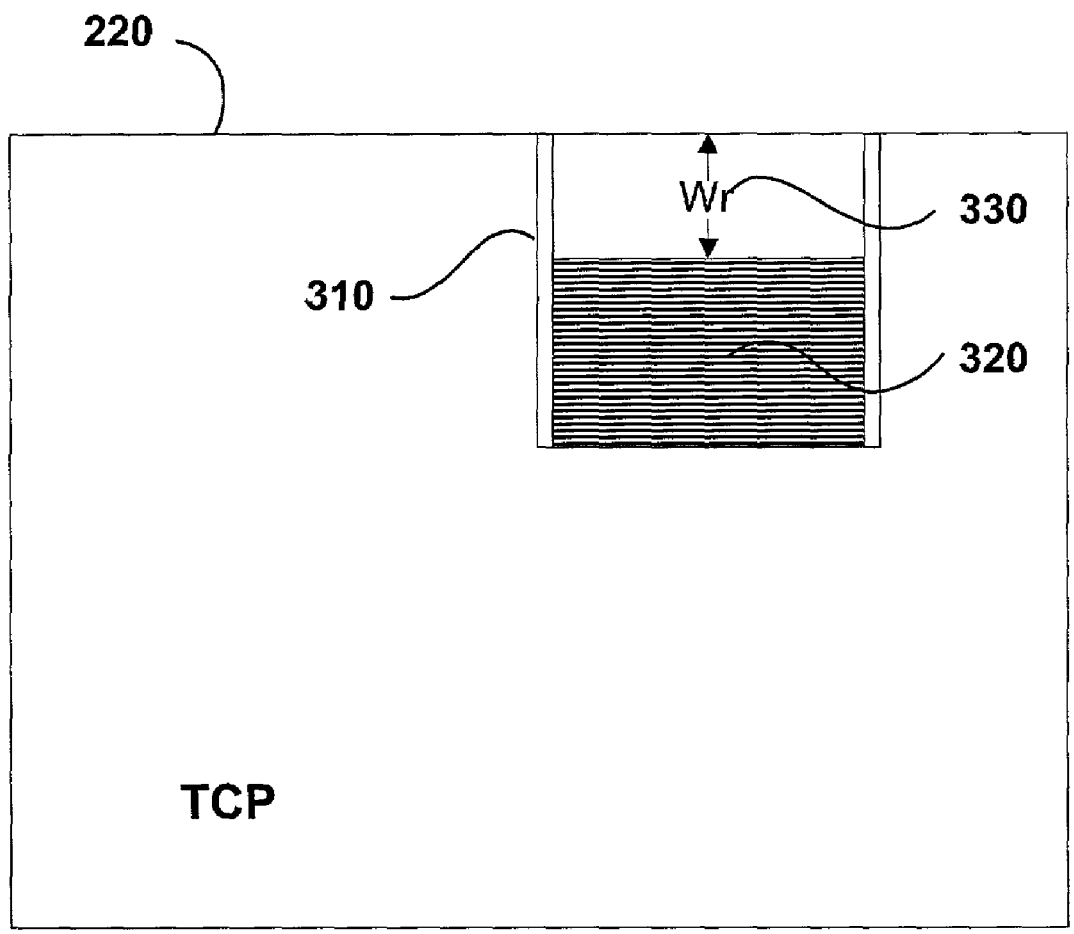
FIG. 3 is a prior art illustration of a receive buffer associated with a TCP layer on a receiver.
Figure 4:
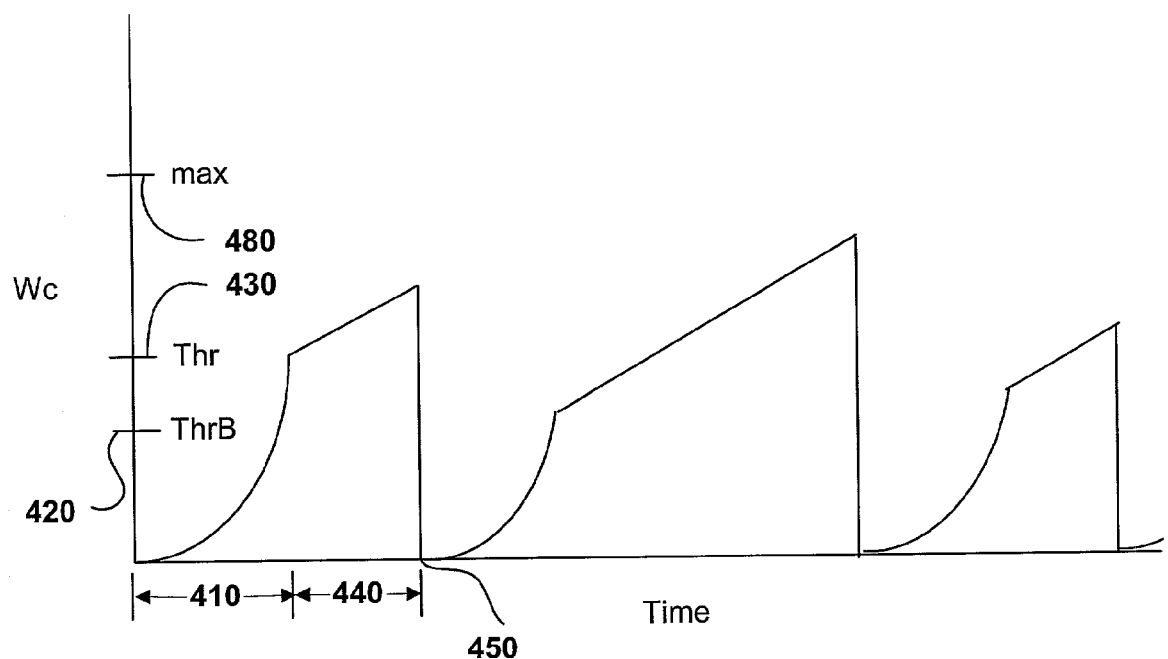
FIG. 4 is a prior art illustration of congestion window size (Wc) as a function of time.

As shown in FIG. 7, implementing rate control module 510 at receiver 520 reduces the frequency of dropped data packets (segments) relative to the prior art of FIG. 4. The reduced frequency of dropped packets is a result of limiting the send window size Ws. Transfer manager 550 in conjunction with rate control module 510 optionally uses feedback and optimization routines to achieve goals determined by priority and transmission schedules. Feedback involves the transfer of performance (transmission rate) data from receiver 520 to transfer manager 550 and optimization routines optionally include queuing of tasks as a function of observed transmission rates. Parameters, including threshold levels, window sizes, buffer sizes, read sizes, and read frequency, are dynamically varied in response to the performance of network 530. For example, the regulation of the transfer rate by rate control module 510 can be dependent on the frequency of lost data packets and rate control module can become proactive only when it detects a certain frequency of lost data packets.

In alternative embodiments, rate control module 510 is present at receiver 520 and sender 540, and rate control module 510 adjusts the size of the TCP buffers of both sender 540 and receiver 520. In one embodiment, the receive window Wr 330 on receiver 520 is dynamically controlled by changing the size of receive buffer 310. A large initial burst of traffic is avoided during the initial period 710 (FIG. 7) by starting with a small receive buffer, 310. Slow growth in the initial transmission rate allows a better estimate of the traffic that can be supported without losing segments.

Reducing the number of lost data packets in a transmission reduces the quantity of segments lost by other traffic on the network and the impact that the transmission has on that traffic. This is important when a goal is to reconcile the effect the transmission has on other network traffic with the priority of the transmission. For example, in some instances it is desirable to send a large file in the "background" without affecting other traffic on the network. In these instances, transfer manager 550 initially sets a low priority for a transmission and later adjusts the priority as a function of a delivery schedule. Rate control module 510 enables the delivery of large files without causing a significant increase in lost data packets.

Figure 8:
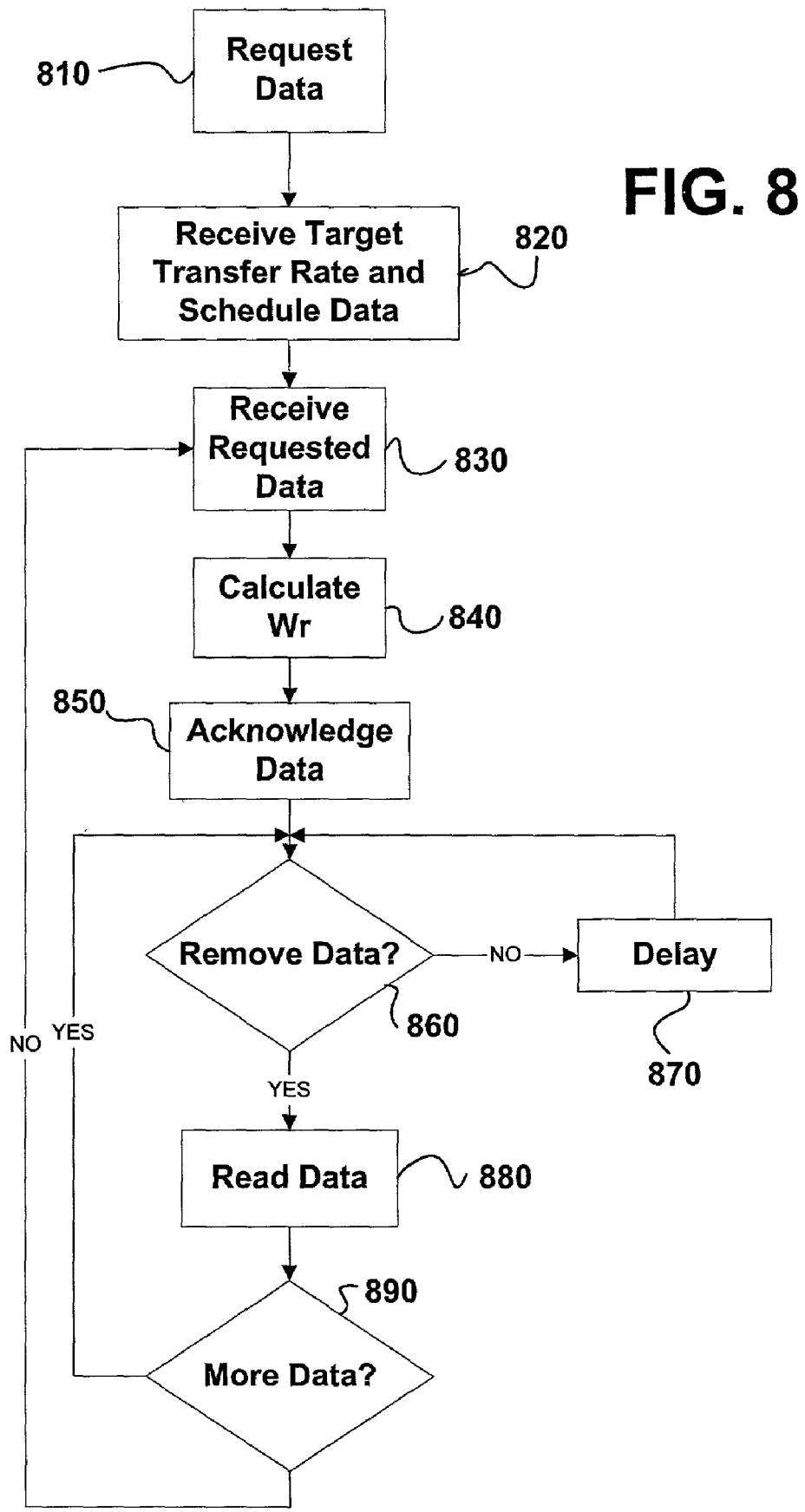
FIG. 8 is a flowchart of method steps for controlling a data transfer rate in a network, according to one embodiment of the invention.

FIG. 8 is a flowchart of method steps for controlling a data transfer rate in a network, according to one embodiment of the invention. First, in step 810, receiver 520 requests data from transfer manager 550 on sender 540. In step 820, receiver 540 receives a target data transfer rate and optional transfer schedule from transfer manager 550. The target data transfer rate and transfer schedule are based on when receiver 520 needs the data and the expected capacity of network 530. Step 820 optionally occurs before step 810, and default values, or values from other sources, are alternatively used in place of values received from transfer manager 550.

In step 830, TCP 220 on receiver 520 receives a requested data segment from sender 540 and places the data segment in receive buffer 310. In step 840, TCP 220 calculates the receive window Wr 330 and places the result within an acknowledgement of the last data transmission. The acknowledgement is then sent to sender 540 in step 850. In a step 860, rate control module 510 running on receiver 520 decides how much data, if any, should be removed from receive buffer 310. The decision is based, in part, on a comparison of an actual transmission rate with the target transfer rate. The decision is also optionally based on other data such as historical transmission rates, a frequency of dropped data packets, or a time since data was last removed from receive buffer 310. For example, if the actual transmission rate is higher than the target transfer rate, removal of data from receive buffer 310 is sometimes delayed such that the receive window size Wr 330 is decreased and the average transmission rate is thereby reduced. If data is not removed, after a delay step 870, then the method returns to step 860. If in step 860 rate control module 510 decides that data should be removed from receive buffer 310, a determined amount is read out in a step 880. In step 890, rate control module 510 determines whether there is more data to be removed from receive buffer 310. If there is more data, the method returns to step 860. If there is not more data, the method returns to step 830.

In another embodiment of the method of the invention, the removal of data in step 860 is replaced by or combined with a step of adjusting the size of receive buffer 310. Both of these actions are used to regulate the value of Wr 330 and thereby control the rate at which data is sent from sender 540 to receiver 520.

Embodiments of rate control module 510 adapted to function in accordance with communication protocols other than TCP that use buffered transmission, for example, those used in systems such as advanced digital telephone networks, video distribution networks, or for the delivery of streaming media, are within the scope of the invention. In these systems a much higher priority is optionally applied to live voice data transmissions than to other data. The transmission of non-voice data is controlled using methods of the invention in a manner that minimizes losses of the higher priority voice data. The invention provides significant advantages when real-time and non-real-time data share a network by providing a method that is able to reduce the impact of the non-real-time data on the transmission of the real-time data.

The invention is optionally used to optimize the scheduling of data transmissions among computer systems. For example, if many large files are to be transmitted, their transmission rate and sequence are optionally adjusted in response to priority criteria and schedules. Files with a lower priority are sent at a lower transmission rate so that files with a higher priority can utilize a higher proportion of available bandwidth. An embodiment of the invention includes a scheduling utility that delivers files to a plurality of receivers according to required delivery dates. The scheduling utility sequences and manages deliveries to have minimum impact on a receiver's other activities.

We claim:

1. A method of regulating an average rate of transmission on a computer network employing TCP wherein the average rate of transmission is regulated to an extent sufficient to reduce the effect that a transmission has on another transmission the computer network, the method comprising:
   determining an amount of available space in a receive buffer at a receiver;
   reading data from the receive buffer such that the amount of available space in the receive buffer is maintained at a regulated value; and
   regulating a rate at which data is delivered to the receive buffer based on a priority of the data, such that the priority of the data results in an absolute transfer rate of the data, wherein the priority of the data is a function of the identity the receiver.

2. The method of claim 1, wherein reading data comprises regulating a frequency at which data is read from the receive buffer.

3. The method of claim 1, wherein reading data comprises regulating an amount of data read during each read from the receive buffer.

4. The method of claim 1, wherein a receiver measures an actual transfer rate.

5. The method of claim 1, wherein determining an amount of available space in a receive buffer is performed by a rate control module located on a receiver.

6. The method of claim 5, wherein the rate control module operates above a TCP layer and communicates with the TCP layer via a TCP application programming interface.

7. The method of claim 1, wherein removing data comprises using a determined frequency of lost packets.

8. A method of regulating an average rate of transmission on a computer network employing TCP wherein the average rate of transmission is reduced, the reduction in average rate of transmission being sufficient to reduce an effect that a transmission has on another transmission in the computer network, the method comprising:
 determining an amount of available space in a receive buffer at a receiver;
 regulating an available space in the receive buffer by regulating a size of the receive buffer; and
 regulating a rate at which data is delivered to the receive buffer based on a priority of the data, such that the priority of the data results in an absolute transfer rate of the data, wherein the priority of the data is a function of the identity of the receiver.

9. The method of claim 8, wherein a receiver determines an actual transfer rate.

10. The method of claim 8, wherein determining an amount of available space in a receive buffer is performed by a rate control module located on a receiver.

11. The method of claim 10, wherein the rate control module operates above a TCP layer and communicates with the TCP layer via a standard TCP application programming interface.

12. The method of claim 8, wherein reducing the receive buffer size comprises using a determined frequency of lost packets.

13. A system for regulating an average rate of transmission on a computer network wherein the average rate of transmission is reduced, the reduction in average rate of transmission being sufficient to reduce an effect that a transmission has on another transmission, the system comprising:
 a receive buffer located on a receiver;
 a rate control module coupled to the receiver, the rate control module configured to determine available space in the receive buffer and to regulate a rate at which data is read from the receive buffer, such that the amount of available space in the receive buffer is maintained at a regulated value and;
 a transfer management module configured to regulate the rate at which data is delivered to the receive buffer based on a priority of the data, wherein the priority of the data results in an absolute transfer rate of the data, wherein the priority of the data is a function of the identity of the receiver.

14. The system of claim 13, wherein the rate control module regulates the rate at which data is read by varying a frequency at which data is read from the receive buffer.

15. The system of claim 13, wherein the rate control module regulates the rate at which data is read by varying an amount of data read during each read from the receive buffer.

16. The system of claim 13, wherein the rate control module operates above a TCP layer and communicates with the TCP layer via a standard TCP application programming interface.

17. The system of claim 16, wherein the rate control module operates between the TCP layer and an FTP/HTTP layer.

18. The system of claim 16, wherein the rate control module is integrated into an FTP/HTTP layer.

19. The system of claim 13, wherein the regulation of a rate at which data is removed is a function of a determined frequency of lost packets.

20. The system of claim 13, wherein the priority of the data is associated with a transmission rate and proportion of utilized bandwidth at which the data is delivered to the receive buffer.

21. The system of claim 13, wherein the priority of the data is further responsive to traffic at the receiver.

22. A system for transmitting data over a computer network employing TCP wherein the average rate of transmission is reduced, the reduction in average rate of transmission being sufficient to reduce an effect that a transmission has on another transmission the system comprising:
 a sender;
 a receiver;
 a receive buffer coupled to the receiver;
 a rate control module configured to regulate an amount of space available in the receive buffer to influence an average rate that data is read from the receive buffer and transferred from the sender to the receiver; and
 a transfer management module configured to regulate communication between the sender and receiver based on a priority of the data, wherein the priority of the data results in art absolute transfer rate of the data and the priority of the data is a function of the identity of the receiver.

23. The system of claim 22, wherein the rate control module regulates the amount of space available in the receive buffer by varying a frequency at which data is read from the receive buffer.

24. The system of claim 22, wherein the rate control module regulates the amount of space available in the receive buffer by varying an amount of data read during each read from the receive buffer.

25. The system of claim 22, wherein the rate control module operates above a TCP layer and communicates with the TCP layer via a standard TCP application programming interface.

26. The system of claim 25, wherein the rate control module operates between the TCP layer and an FTP/HTTP layer.

27. The system of claim 25, wherein the rate control module is integrated into an FTP/HTTP layer.

28. The system of claim 22, wherein the rate control module regulates the amount of space using a determined frequency of lost packets.

29. The system of claim 22, wherein the transfer management module further comprises a schedule manager.

30. The system of claim 22, wherein the priority of the data is associated with a transmission rate and proportion of utilized bandwidth.

31. The system of claim 22, wherein the priority of the data is further responsive to traffic at the receiver.

* * * * *